US010041513B2

(12) United States Patent

Böhner

(10) Patent No.: US 10,041,513 B2
(45) Date of Patent: Aug. 7, 2018

(54) HYDRAULIC ACTUATING DRIVE HAVING A SPRING FOR TRANSFERRING INTO AN EMERGENCY POSITION

(71) Applicant: BÖHNER-EH GMBH, Burghaslach (DE)

(72) Inventor: Christian Böhner, Burghaslach (DE)

(73) Assignee: BÖHNER-EH GMBH, Burghaslach (DE)

( * ) Notice: Subject to any disclaimer, the term of this patent is extended or adjusted under 35 U.S.C. 154(b) by 24 days.

(21) Appl. No.: 15/507,742

(22) PCT Filed: Sep. 1, 2015

(86) PCT No.: PCT/EP2015/069950
§ 371 (c)(1),
(2) Date: Aug. 7, 2017

(87) PCT Pub. No.: WO2016/034582
PCT Pub. Date: Mar. 10, 2016

(65) Prior Publication Data

US 2017/0350426 A1 Dec. 7, 2017

(30) Foreign Application Priority Data

Sep. 1, 2014 (DE) ........................ 10 2014 012 694

(51) Int. Cl.
*F15B 15/14* (2006.01)
*F15B 1/02* (2006.01)
(Continued)

(52) U.S. Cl.
CPC .......... *F15B 15/1476* (2013.01); *F15B 1/024* (2013.01); *F15B 11/10* (2013.01);
(Continued)

(58) Field of Classification Search
CPC ...... F15B 1/024; F15B 11/10; F15B 15/1409; F15B 20/004; F15B 15/1476; F15B 15/14; F15B 15/18
(Continued)

(56) References Cited

U.S. PATENT DOCUMENTS

RE30,115 E * 10/1979 Herd .................. F16K 31/1225 137/236.1
4,294,284 A * 10/1981 Herd ....................... E21B 34/04 137/236.1
(Continued)

FOREIGN PATENT DOCUMENTS

DE 102004045011 A1 4/2006
DE 102008036980 A1 2/2010
(Continued)

OTHER PUBLICATIONS

Written Opinion of the International Searching Authority in related International Application No. PCT/EP2015/069950 dated Nov. 5, 2015, 5 pages.

*Primary Examiner* — Michael Leslie
*Assistant Examiner* — Richard Drake
(74) *Attorney, Agent, or Firm* — Troutman Sanders LLP

(57) ABSTRACT

The invention relates to a hydraulic device for driving an actuator to be hydraulically controlled or actuated, comprising a motor arranged in a motor housing, a compensating tank (31) for accommodating hydraulic fluid, and a hydraulic pump, which is arranged in a pump housing and driven by the motor, wherein the hydraulic pump is designed in such a way that the hydraulic pump permits conveyance of hydraulic fluid in two directions, namely in the forward direction and in the backward direction.

16 Claims, 4 Drawing Sheets

(51) Int. Cl.
*F15B 11/10* (2006.01)
*F15B 20/00* (2006.01)

(52) U.S. Cl.
CPC ........ *F15B 15/1409* (2013.01); *F15B 20/004* (2013.01); *F15B 2211/20561* (2013.01); *F15B 2211/27* (2013.01); *F15B 2211/63* (2013.01); *F15B 2211/7053* (2013.01); *F15B 2211/8752* (2013.01)

(58) Field of Classification Search
USPC ..................................... 60/403; 251/62, 63.6
See application file for complete search history.

(56) References Cited

U.S. PATENT DOCUMENTS 6,598,849 B2 * 7/2003 Hoang .................... E21B 21/10 251/62
8,549,984 B2 * 10/2013 Arnold .................. F15B 20/004 251/14
8,579,249 B2 * 11/2013 McCarty ............. F16K 31/1221 251/337
8,596,608 B2 * 12/2013 Grimseth ............ E21B 33/0355 137/12
9,239,064 B2 * 1/2016 Helbig .................. F15B 20/002
9,464,644 B2 * 10/2016 Schwacke ........... F15B 15/1409
9,541,104 B2 * 1/2017 McEvoy ............. F16K 31/1221
9,631,455 B2 * 4/2017 Geiger ................ E21B 33/0355
9,803,657 B2 * 10/2017 Froehlich .............. F15B 11/072
2007/0075285 A1 * 4/2007 Lovejoy .................. F01D 17/10 251/129.03
2011/0155937 A1 6/2011 Arnold
2012/0240565 A1 * 9/2012 Schnabel ................ F16H 61/30 60/327
2017/0023086 A1 * 1/2017 Ogawa ...................... B61F 5/24

FOREIGN PATENT DOCUMENTS

DE 102011012305 A1 8/2012
EP 1199501 A1 4/2002

* cited by examiner 24
27
25
F
P
26
31
14
13
16
11
15
23
21
22
12
33
39
35
37
1
43
M
36
42
40
32
5
3
4
6
38
34
2
50
P
R

HYDRAULIC ACTUATING DRIVE HAVING A SPRING FOR TRANSFERRING INTO AN EMERGENCY POSITION

CROSS-REFERENCE TO RELATED APPLICATIONS

This application is a United States national stage entry of an International Application serial no. PCT/EP 2015/069950 filed Sep. 1, 2015 which claims priority to German Patent Application serial no. 10 2014 012 694.3 filed Sep. 1, 2014. The contents of these applications are incorporated herein by reference in their entirety as if set forth verbatim.

The invention relates to a hydraulic device for driving an actuator which can be regulated or actuated hydraulically and having the features of the preamble of claim 1.

DE 10 2008 025 054 B4 discloses a hydraulic device which can be used to regulate or actuate the position of an actuator hydraulically. For this purpose, the hydraulic device has a motor, which is arranged in a motor housing. For the purpose of accommodating hydraulic fluid, a compensating tank is integrated in the hydraulic device. The motor is coupled to a hydraulic pump, which is arranged in a pump housing, wherein the hydraulic pump is designed such that it allows hydraulic fluid to be delivered in two directions, namely in the forward and rearward directions, in order for it to be possible for the actuator to be regulated or actuated precisely in both directions. For this purpose, the hydraulic actuator comprises a drive cylinder with a first and second cylinder chamber and a drive piston, which is arranged between said chambers and to which is fitted a longitudinally displaceable drive spindle. The drive spindle can be used to move or activate controllable elements such as valves, switches, robot arms and the like.

Laid-open application DE 10 2011 012 305 discloses a hydraulic actuating arrangement with a regulating valve, which is provided with an emergency-actuation function. The emergency-actuation function can be triggered electrically or hydraulically. The device according to the aforementioned document is complicated and is not designed in optimum fashion in respect of the safety and speed of an emergency-actuation function.

The invention is based on the object of designing a device having the features of the preamble of claim 1 such that said device can establish and maintain the state of operational readiness of the device, including the emergency switch-off function, it is possible, once the state of operational readiness has been reached, to carry out a regulating, actuating or switching operation with a high level of precision and adaptability to the respective areas of use, and an emergency switch-off function can be performed reliably and at high speed, or at a defined speed. This object is achieved by the characterizing features of claim 1; advantageous developments can be gathered from dependent claims 2-16.

The core of the invention is considered, in the first instance, to be that the device comprises a bracing cylinder for an emergency closing spring. The bracing cylinder has arranged in it a bracing-cylinder chamber and a bracing piston, which can be coupled to the drive spindle. The bracing piston can brace the emergency closing spring hydraulically in a bracing or emergency triggering standby position, wherein the bracing-cylinder chamber is connected to an exit of the hydraulic pump such that, as a result of the hydraulic pressure of the hydraulic pump, the bracing-cylinder chamber can be filled with hydraulic fluid. As a result, the emergency closing spring is transferred into a braced position and, in this braced position, is locked hydraulically by check valves.

A controlled seat valve is connected to an inflow or outflow opening of the bracing-cylinder chamber, said seat valve being capable of transferring the emergency closing spring from the braced standby position into an emergency triggering position, for which purpose both the hydraulic fluid which keeps the emergency closing spring in the standby position, and is located in the bracing-cylinder chamber, and the hydraulic fluid which is located in the first cylinder chamber are discharged via the controlled seat valve, in order to transfer the drive spindle into an emergency triggering position.

(Emergency Triggering Position Can Possibly Be Replaced by Emergency Position Open or Closed))

The hydraulic pump of the hydraulic device therefore serves, on the one hand, to brace the emergency closing device and transfer it into a standby position, but also, on the other hand, by follow-up operation in the forward and rearward directions, to move the hydraulic actuator with the drive cylinder back and forth in the first and second cylinder chambers in order to regulate the coupled valve or switch, robot element or the like or to move to a certain position of the same. The bracing-cylinder chamber is relieved of loading in the case of the emergency triggering function, and the first drive-cylinder chamber, which is directed away from the emergency closing spring, is emptied, by one and the same seat valve, which may also be referred to as an emergency triggering valve, wherein relieving the hydraulic chambers of loading simultaneously results in a very quick response of the emergency triggering function.

The hydraulic device with its emergency switch-off function is suitable for valves with any media and for mechanical actuation. The basic principle here is that, in the event of a power outage or a specific switching-off operation, a defined position can be reached reliably in a very short or defined period of time as a result of the mechanical spring mechanism. Examples are valves in gas and water lines, in steam feeds for turbines, pipeline valves, valves in chemical installations and also electric switches for high outputs and the like.

In relation to the prior art, the state of operational readiness is established, the regulating and actuating operation as well as the emergency switch-off operation of the device are achieved, by reduced means. The device is advantageously regulated counter to the process forces actually acting on the device, and not counter to the force of the emergency closing spring. This results in a considerable reduction in the amount of energy used for operating the device. In order to establish the state of operational readiness, the potential energy, namely the spring prestressing, is built up and stored by the hydraulic pump, which also carries out a regulating or actuating operation. The storage is associated with a significant reduction in the amount of energy used. Once the state of operational readiness has been established, linear displacement or force regulation of the actuator can then take place with a high level of accuracy. It is possible to move to one or more positions and for switching operations to be carried out. Once actuating or switching operations have taken place, the drive of the hydraulic pump can be switched off. If deviations in position occur, these can be corrected again. This gives rise to a further reduction in the amount of operating energy which is necessary.

The emergency closing operation is inevitably triggered in the event of a power outage or of the seat valve or emergency valve being switched off. The emergency valve here performs a positive opening function and connects all the hydraulic-cylinder chambers to the compensating tank and the spring chamber. The prestressed spring can thus move all the pistons and, in particular, also the linear drive into a defined end position. The closing time here is very short or definable, namely in the range of a few milliseconds, and the timing can be defined by throttles or flow-control valves being installed. The emergency valve is constructed such that the pressurized medium flows out by way of a conical seat or plate seat such that the flow of medium opens the valve. The opening operation can be assisted, in addition, by an opening spring. The valve is closed by an electro-magnet or closing mechanisms which operate in some other way.

The invention will be explained in more detail with reference to advantageous exemplary embodiments in the figures of the drawings, in which.

PRODUCTION AND STATE OF OPERATIONAL READINESS

Figures 1, 2:
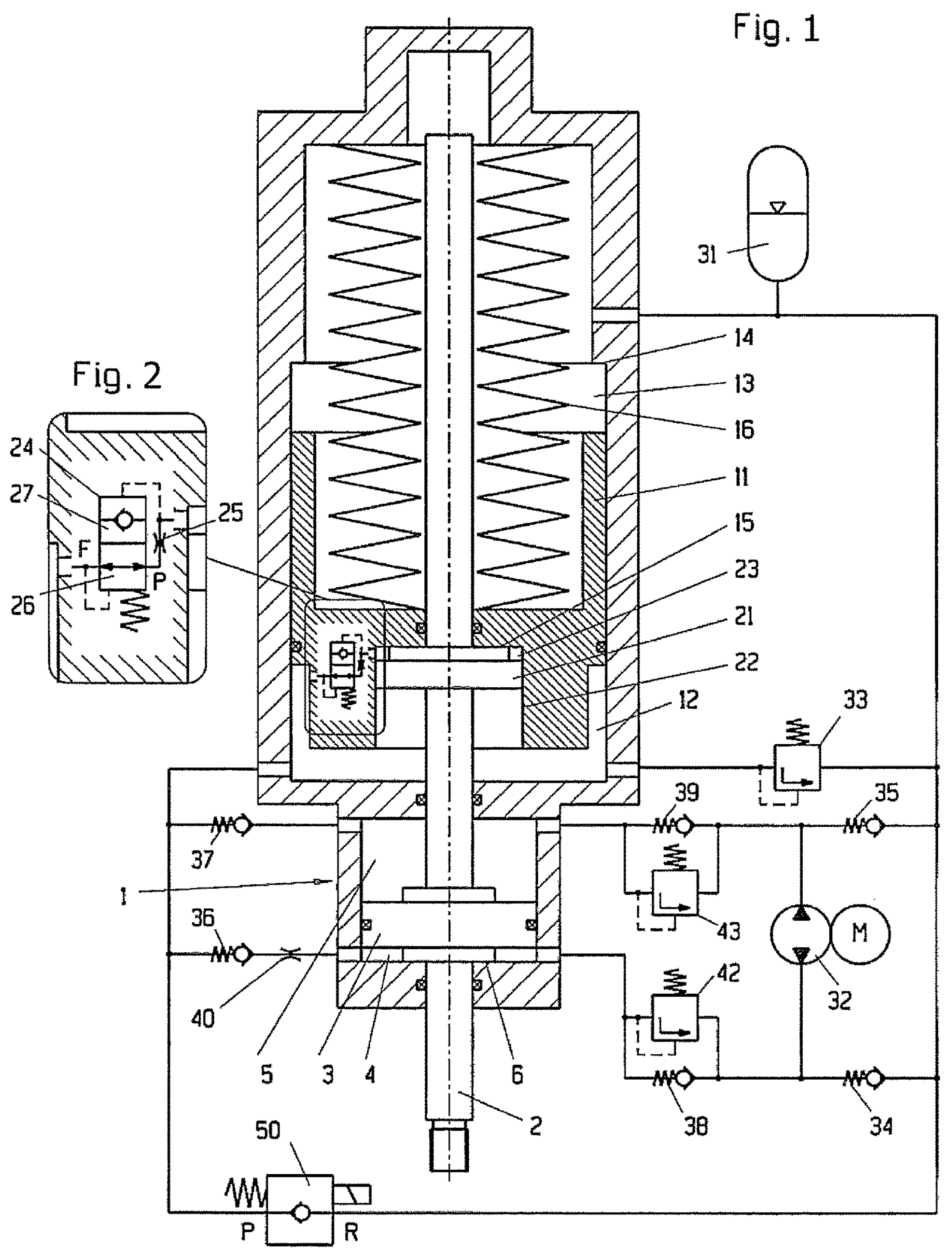
FIG. 1 shows a schematic sectional illustration of the device with a drive cylinder, bracing cylinder, carry-along cylinder and also a connected pump and connected valves.
FIG. 2 shows a detail view of the volume-flow-dependent two-way valve, which is also illustrated in reduced size in FIG. 1.

The drive cylinder 1 of the device illustrated in FIG. 1 is electrically switched off and located in a basic position in an extended state against the stop 6 and, in the process, is pushed against said stop by the force of the emergency closing spring 16. If the emergency drive has been mounted on elements which can be actuated, in particular valves, then the basic position is achieved even before the stop 6 is reached. The force of the extended emergency closing spring 16 then acts, for example, on a fitted-on valve and provides for reliable closure (emergency position).

Figure 5:
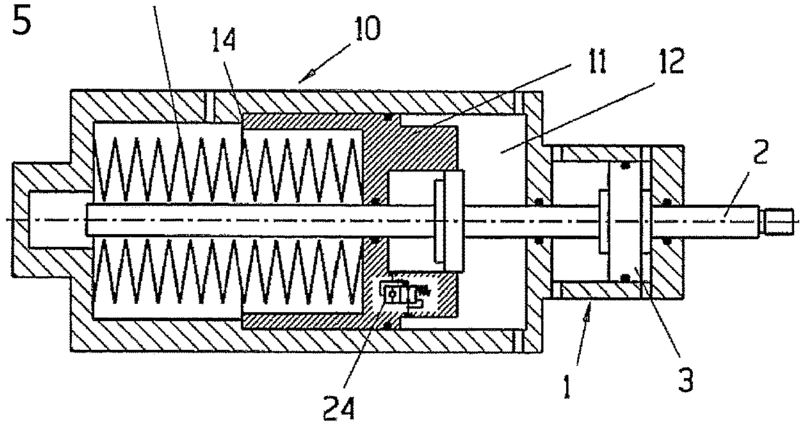
FIG. 5 shows an illustration according to FIG. 4, this time with the bracing piston in a standby position.

In order to establish the state of operational readiness of the emergency closing, regulating, actuating and switching drive, it is necessary first of all to switch the controlled seat valve 50 (emergency valve). Throughout the period of operation, this valve 50 has to be located in blocking position 52. It is also necessary to build up the potential energy for an emergency closing operation. If the hydraulic pump 32 delivers hydraulic fluid through the cylinder chamber 5, and through the check valve 37, into the bracing-cylinder chamber 12, then the bracing piston 11 moves as far as the piston stop 14 (FIGS. 1 and 5). The emergency closing spring 16 is thus braced. The level of bracing pressure can increase until it is limited by the pressure-limiting valve 33. The point where the end position is reached can be signaled by a pressure sensor 64 or displacement sensor 60, 61, for position-monitoring purposes or in order to initiate further control steps. The medium which is to be delivered can be removed from the spring chamber 13 by the hydraulic pump 32 by way of the check valve 34. The bracing piston 11 remains blocked in the blocking position 52 by way of the check valves 36, 37 and the valve 50. When the emergency closing spring 16 is being braced, the drive spindle 2, along with the drive piston 3 and the carry-along piston 21, remains in the basic position (FIG. 5). The medium can flow into the increasing volume of the carry-along chamber 23 by way of the volume-flow-dependent 2-way valve 24.

Regulating and Actuating Operation

Figure 6:
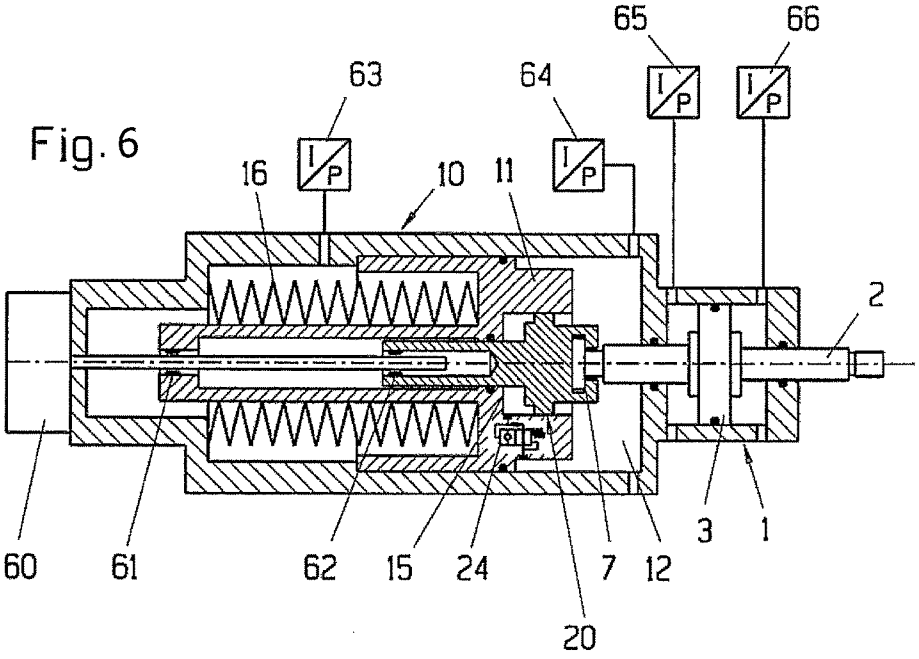
FIG. 6 shows a modified arrangement according to FIG. 5, with the bracing piston in the standby position, wherein the illustration shows a coupling in the region of the carry-along piston and shows the drive piston in a central regulating position.

Once the state of operational readiness has been reached, a regulating, actuating or switching operation can be carried out (FIG. 6). The position which is to be reached can be influenced by displacement, force or pressure or may be a signal from a fitted-on element. The direction of rotation and delivery quantity of the hydraulic pump 32 determine the movement direction and speed of the drive spindle 2. The medium is delivered back and forth in each case from the cylinder chambers 4 and 5 (FIG. 1). The respective pressure builds up in accordance with the adjustment forces which have to be overcome. Medium which may be lacking from the intake region of the hydraulic pump 32 as a result of changes in temperature, compression or leakage losses can be removed from the compensating tank 31 by the respective check valve 34 or 35. Excess medium in cylinder chambers can flow out into the compensating tank 31 by way of the check valves 36 or 37, via the pressure-limiting valve 33, as long as it has not been used beforehand to fill up, in whole or in part, any losses in the bracing-cylinder chamber 12.

If the pressures necessary for reliably maintaining the regulating position are not ensured, then these can be achieved by way of the check valves 38, 39 and the pressure-limiting valves 42, 43 (FIG. 1). The movement direction and speed of the drive spindle 2 are determined by the direction of rotation and delivery quantity of the hydraulic pump 32. As a consequence of medium being delivered into the cylinder chambers 4 or 5, medium from the other chamber in each case flows, via a check valve 36 or 37, into the bracing-cylinder chamber 12 and maintains the pressure there until it is limited by the pressure-limiting valve 33. As a result, the full bracing of the emergency closing spring 16 and the end position of the bracing piston 11 are constantly maintained. If the bracing piston 11 is already positioned against the piston stop 14, then the medium flows, via the respective pressure-limiting valve 42, 43, to the intake side of the hydraulic pump 32. The difference in the pressures in the cylinder chambers 4 and 5 is critical for the force generated at the drive spindle 2. Since, for the purpose of moving the drive, it is also necessary to overcome the pressure on the opposite side of the drive piston 3, the energy-related outlay is correspondingly higher. The pressure prevailing in each cylinder chamber 4, 5, however, is at least level with the setting of the pressure-limiting valves 42 or 43, and the drive piston 3 is therefore always braced in position. The position of the drive spindle 2 is thus maintained and the hydraulic pump 32 can be switched off. Depending on the application area, this gives rise to a quite significant reduction in the amount of energy used. The method is not just particularly suitable for actuating and switching operations; it is also the case that regulating operations with correspondingly large, permissible regulating deviations and suitable time frames can be carried out progressively. It is a prerequisite for the set pressure of the pressure-limiting valve 33 to be greater than the sum of the respective set pressure of the pressure-limiting valves 42 or 43 and of the maximum pressure necessary for the cylinder chambers 4 and 5. Furthermore, the maximum bracing of the emergency spring 16 already has to be achieved, i.e. the bracing piston 11 has to butt against the piston stop 14, at the set pressure of the pressure-limiting valves 42, 43.

Emergency Switch-Off Function

Figure 3:
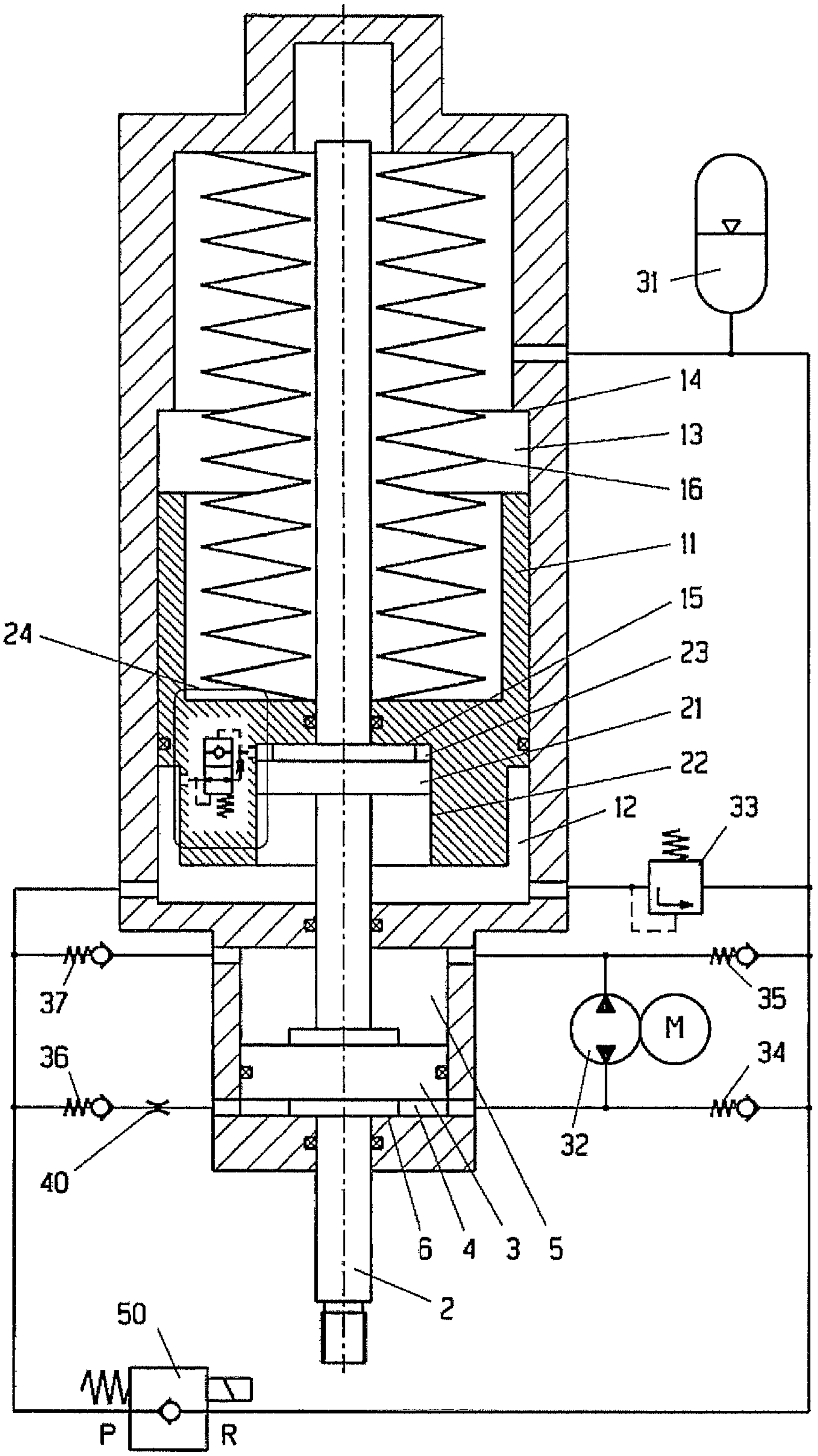
FIG. 3 shows a figure corresponding to FIG. 1, but in a somewhat simplified state.
Figure 4:
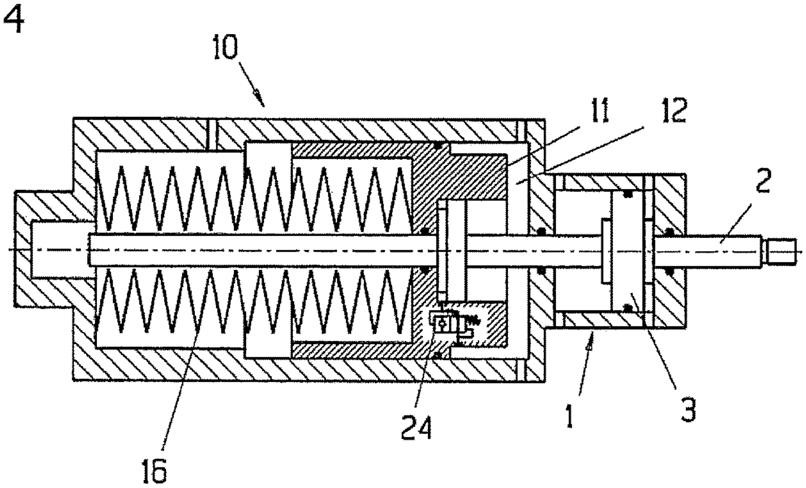
FIG. 4 shows a detail-form illustration of the bracing piston, which is located in the bracing-cylinder chamber, in a basic position.

An emergency switch-off function is performed whenever the seat valve 50 is switched off, that is to say is in a de-energized state and moves into the throughflow position 51. The medium from the bracing-cylinder chamber 12, said medium being pressurized by way of the emergency closing spring 16, flows directly into the spring chamber 13, and the medium from the cylinder chamber 4 flows by way of the throttle 40 and the check valve 36, and via the check valves 35, 39 (FIG. 3), into the cylinder chamber 5. Differences in volume as a result of the extending drive spindle 2, and caused by changes in temperature and pressure, are compensated for by the compensating tank 31. If the hydraulic pump 32 performs a delivery function during the emergency switch-off operation or thereafter, this has no effect, since the medium delivered can circulate in a pressure-free manner in all directions. If there is a distance between the carry-along piston 21 and the carry-along surface 15 of the bracing piston 11 (FIG. 6), then the carry-along chamber 23 has been filled with medium. Immediately after the emergency switch-off function has been triggered, the emergency closing spring 16 generates a rapid increase in pressure within and, as a result, switches the volume-flow-dependent 2-way valve 24 into blocking position 27. There is a defined gap between the carry-along cylinder 22 and carry-along piston 21, and the volume blocked within the carry-along chamber 23 can flow out through said gap in a defined manner by throttling. The resulting pressure has to be large enough for the resulting force to be greater than the maximum regulating or actuating force and for the drive spindle 2 not to be capable of moving counter to the emergency closing direction. The emergency closing speed can be determined by the throttle 40.

The drive can also be configured to function in the opposite (pulling) direction. All that is required for this purpose is for the bracing cylinder 10, along with the emergency closing spring and the carry-along cylinder 20, to be arranged in a state in which they are rotated through 180°.

The compensating tank 31, which is designed for example in the form of a low-pressure accumulator, serves for volume-compensating purposes during movement of the drive spindle 2, and in the case of changes in volume as a result of temperature variation and compression in the case of changes in pressure. A further task is that of keeping a pressure within the hermetically sealed drive to a level above atmospheric pressure. As a result of this positive pressure, all the static seals are always pushed outwards and therefore do not undergo any wear. Furthermore, the medium is protected against the absorption of air. The only moving element between the interior of the drive and the atmosphere is the outlet for the drive spindle 2.

Figure 7:
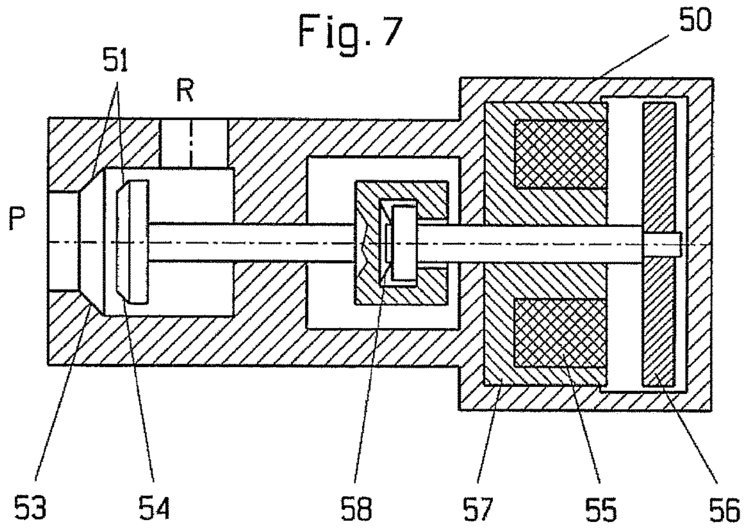
FIG. 7 shows an illustration of the emergency closing valve in a normally open state.
Figure 8:
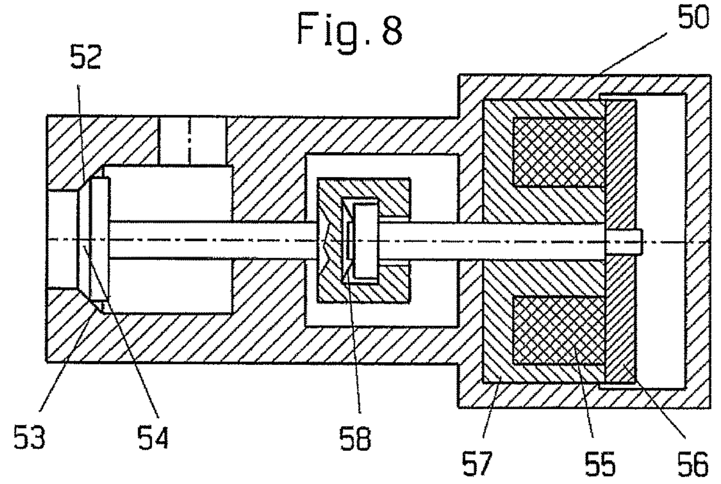
FIG. 8 shows an illustration of the emergency closing valve in an energized state in the closed position.

The seat valve 50, which is designed for example in the form of a controlled check valve, is designed such that, when the electric holding current is switched off or in the event of a power outage, the valve seat 53, 54 always opens (FIG. 7). The valve cone 54 and thus also the armature 56 are moved into the throughflow position 51 by the volume flow from P to R. If the solenoid 55 is energized, the armature 56 positions itself against the same and pushes the valve cone 54 into the valve seat 53. The valve 50 is thus closed (FIG. 8). Since the valve seat 53, 54 has to be kept closed with the defined force and, in addition, the holding electromagnet achieves its greatest holding force when the armature 56 is butting against the magnet yoke 57, a spring-compensation means 58 is provided for lengthwise compensation of the mechanical components. The spring force has to be greater than the necessary closing force of the valve seat, but smaller than the safely applied electric holding force of the electromagnet. The medium pressure produced by the emergency closing spring 16 during the emergency closing operation has to be large enough at the connection (P) to overcome the residual force made up of the remanent magnetization in the magnet yoke 57 and armature 56 once the solenoid 55 has been switched off. All the components of the valve 50 are located within the region of the medium and are sealed in relation to the atmosphere. In so far as the throughflow position 51 of the switched-off valve 50 has to be maintained, the restoring spring 59 (FIG. 9) is provided for this purpose.

Figure 9:
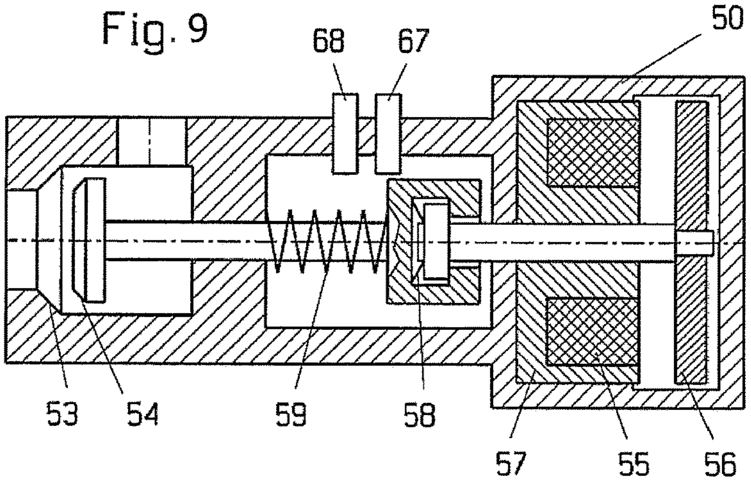
FIG. 9 shows an illustration of a modified emergency closing valve with a restoring spring, which assists the opening operation, and two fitted-on sensors for the two valve positions.

The displacement sensor 60 serves for controlling and monitoring displacement and position. The position sensor 61 signals the position of the bracing piston 11 and thus the state of operational readiness of the emergency closing spring 16. The position sensor 62 signals the position of the drive spindle 2. The pressure sensors signal the respective hydraulic pressures: pressure sensor 63 is used for spring chamber 13 and compensating tank 31; pressure sensor 64 is used for bracing-cylinder chamber 12; pressure sensor 65 is used for cylinder chamber with extension 5 and pressure sensor 66 is used for cylinder chamber with retraction 4. The position of the controlled seat valve 50 (emergency valve) is monitored by a displacement sensor or by position sensors (FIG. 9). The position sensor 67 signals the throughflow position 51 (basic position, valve open), and the position sensor 68 signals the blocking position 52, valve closed.

If the dimensions of the emergency closing drive are made larger, it is no longer possible, or expedient, to configure the drive spindle 2 continuously with the carry-along cylinder 20 and the emergency bracing cylinder 10 and produce the same within the required narrow tolerances. For this purpose, the drive spindle 2 is separated by a coupling 7 (FIG. 6), which allows radial offsetting.

LIST OF REFERENCE SIGNS

1 Drive cylinder
2 Drive spindle
3 Drive piston
4 Cylinder chamber with retraction
5 Cylinder chamber with extension
6 Stop cylinder with extension
7 Coupling
10 Bracing cylinder
11 Bracing piston
12 Bracing-cylinder chamber
13 Spring chamber
14 Piston stop
15 Carry-along surface
16 Emergency closing spring
20 Carry-along cylinder
21 Carry-along piston
22 Carry-along cylinder
23 Carry-along chamber
24 Volume-flow-dependent 2-way valve

25 Throttle
26 Throughflow position
27 Blocking position
31 Compensating tank
32 Hydraulic pump
33 Pressure-limiting valve
34 Check valve
35 Check valve
36 Check valve
37 Check valve
38 Check valve
39 Check valve
40 Throttle
42 Pressure-limiting valve
43 Pressure-limiting valve
50 Seat valve (emergency valve)
51 Throughflow position
52 Blocking position
53 Valve seat
54 Valve cone
55 Solenoid
56 Armature
57 Magnet yoke
58 Spring-compensation means
59 Restoring spring
60 Displacement sensor
61 Position sensor
62 Position sensor
63 Pressure sensor
64 Pressure sensor
65 Pressure sensor
66 Pressure sensor
67 Position sensor
68 Position sensor

The invention claimed is:

1. A hydraulic device for driving an actuator which can be regulated or actuated hydraulically, having a motor, which is arranged in a motor housing, a compensating tank (31) for accommodating hydraulic fluid, a hydraulic pump (32), which is arranged in a pump housing and is driven by the motor, wherein the hydraulic pump (32) is designed such that it allows hydraulic fluid to be delivered in two directions, namely in the forward and rearward directions, wherein the hydraulic actuator comprises a drive cylinder (1) with a first (4) and a second (5) cylinder chamber and a drive piston (3), which is arranged between said chambers and to which is fitted a longitudinally displaceable drive spindle (2), characterized in that the device comprises a bracing cylinder (10) for an emergency closing spring (16), the bracing cylinder has arranged in it a bracing-cylinder chamber (12) and a bracing piston (11), which can be coupled to the drive spindle (2), wherein the bracing piston (11) can brace the emergency closing spring (16) in a bracing or emergency triggering standby position, wherein the bracing-cylinder chamber (12) is connected to an exit of the hydraulic pump (32) such that, as a result of the hydraulic pressure of the hydraulic pump (32), the bracing-cylinder chamber (12) can be filled with hydraulic fluid, and the bracing piston (11) during compressing operation the emergency closing spring (16) can be transferred into a bracing position and can be locked there hydraulically by check valves (36, 37), and wherein a controlled seat valve (50) is connected to an inflow/outflow opening of the bracing-cylinder chamber (12), said seat valve being capable of transferring the emergency closing spring (16) from the braced standby position into an emergency triggering open position, wherein it is possible for both hydraulic fluid which keeps the emergency closing spring (16) in the standby position, and is located in the bracing-cylinder chamber (12), and for the hydraulic fluid which is located in the first cylinder chamber (4) to be discharged via the controlled seat valve (50).

2. The hydraulic device as claimed in claim 1, characterized in that an exit (R) of the controlled seat valve (50) is connected to a spring chamber (13) of the bracing cylinder (10), said spring chamber containing the emergency triggering spring (16).

3. The hydraulic device as claimed in claim 1, characterized in that the drive spindle (2) and the drive piston (3) are coupled to the bracing piston (11) such that, when the bracing piston (11) is locked hydraulically in the standby position, the drive spindle (2) and the drive piston (3) can be displaced linearly, in dependence on the pressure applied by the hydraulic pump (32), in the longitudinal direction of the drive spindle (2) in order to execute a control/regulating and/or switching movement.

4. The hydraulic device as claimed in claim 1, characterized in that the compensating tank (31) is connected to the exit (R) of the controlled seat valve (50).

5. The hydraulic device as claimed in claim 1, characterized in that hydraulic exits of the first (4) and of the second (5) cylinder chambers of the drive cylinder (1) are connected to the bracing-cylinder chamber (12) via check valves (36, 37) so as to block a hydraulic flow from the bracing-cylinder chamber (12) into the first and second cylinder chambers (4, 5) of the drive cylinder (1).

6. The hydraulic device as claimed in claim 1, characterized in that a hydraulic exit of the bracing-cylinder chamber (12) is connected to the spring chamber (13) and/or the compensating tank (31) via a pressure-limiting valve (33).

7. The hydraulic device as claimed in claim 1, characterized in that the controlled seat valve (50) comprises a magnetically, electrically, mechanically, pneumatically or hydraulically controlled emergency triggering mechanism which transfers the seat valve (50) into a throughflow position.

8. The hydraulic device as claimed in claim 1, characterized in that the arrangement, in the region of the bracing cylinder (10), of at least one displacement sensor (60) and/or at least one position sensor (61, 62), which make it possible to detect a state of operational readiness and/or a position of the bracing piston (11) and/or of the drive piston (3).

9. The hydraulic device as claimed in claim 1, characterized in that the arrangement, in the region of the bracing cylinder (10), of at least one pressure sensor (63, 64, 65, 66), which makes it possible to detect hydraulic pressures for the spring chamber (13), bracing-cylinder chamber (12) and/or actuating-cylinder chambers (4, 5).

10. The hydraulic device as claimed in claim 1, characterized in that the arrangement, on the controlled seat valve (50), of at least one displacement sensor or position sensor (67, 68), which make it possible to detect an open/closed position of the controlled seat valve (50).

11. The hydraulic device as claimed in claim 1, characterized in that the drive spindle (2) is designed in a number of parts and the parts of the drive spindle (2) are connected via a coupling (7), which allows the drive spindle (2) to be offset radially and is arranged in the transition region between carry-along cylinder (20) and bracing cylinder (10).

12. The hydraulic device as claimed in claim 1, characterized in that the drive spindle (2) is coupled to the bracing piston (11) via a carry-along cylinder (20) with a carry-along piston (21) which is movable therein, wherein the carry-along piston (21) and the bracing piston (11) have arranged between them a hydraulic carry-along chamber (23), which is connected to the bracing-cylinder chamber (12) via a volume-flow-dependent two-way valve (24).

13. The hydraulic device as claimed in claim 12, characterized in that the hydraulic volume blocked within the hydraulic carry-along chamber (23) can be discharged therefrom in a defined manner by throttling action.

14. The hydraulic device as claimed in claim 1, characterized in that an emergency closing valve is coupled to the drive spindle (2) of the hydraulic actuating arrangement.

15. The hydraulic device as claimed in claim 14, characterized in that the emergency closing valve is a valve which can be regulated.

16. The hydraulic device as claimed in claim 1, characterized in that an actuating or switching drive with an emergency switch-off function is coupled to the drive spindle (2) of the hydraulic actuating arrangement.

* * * * *